(12) United States Patent
Fukuda et al.

(10) Patent No.: US 10,788,826 B2
(45) Date of Patent: Sep. 29, 2020

(54) VEHICLE CONTROL DEVICE

(71) Applicant: HITACHI AUTOMOTIVE SYSTEMS, LTD., Hitachinaka-shi, Ibaraki (JP)

(72) Inventors: Takeshi Fukuda, Tokyo (JP); Fumio Narisawa, Tokyo (JP); Tomohito Ebina, Ibaraki (JP); Kosei Goto, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 148 days.

(21) Appl. No.: 15/735,050

(22) PCT Filed: Jul. 20, 2016

(86) PCT No.: PCT/JP2016/071199
§ 371 (c)(1),
(2) Date: Dec. 8, 2017

(87) PCT Pub. No.: WO2017/022476
PCT Pub. Date: Feb. 9, 2017

(65) Prior Publication Data
US 2018/0181124 A1  Jun. 28, 2018

(30) Foreign Application Priority Data
Jul. 31, 2015  (JP) .................. 2015-151847

(51) Int. Cl.
*G05D 1/00* (2006.01)
*G06F 11/30* (2006.01)
(Continued)

(52) U.S. Cl.
CPC ....... *G05D 1/0066* (2013.01); *G06F 11/0724* (2013.01); *G06F 11/0739* (2013.01);
(Continued)

(58) Field of Classification Search
CPC .............. G05D 1/0066; G06F 11/0724; G06F 11/0739; G06F 11/20; G06F 11/2023;
(Continued)

(56) References Cited

U.S. PATENT DOCUMENTS 7,328,235 B2 *  2/2008  Mori ................... G06F 11/1658
709/202
9,221,396 B1 *  12/2015  Zhu ....................... B60Q 9/008
(Continued)

FOREIGN PATENT DOCUMENTS

EP   2 192 489 A1    6/2010
JP   2002-287997 A   10/2002
(Continued)

OTHER PUBLICATIONS

Supplementary European Search Report for Appl. Ser. No. 16832755.9, dated Mar. 18, 2019, 12 pages.
(Continued)

*Primary Examiner* — Anshul Sood
(74) *Attorney, Agent, or Firm* — Foley & Lardner LLP

(57) ABSTRACT

Provided is a vehicle control device capable of reducing a control gap that occurs when a system is restored to a normal state after a malfunction is corrected, thereby achieving smooth driving performance for a user. A vehicle control device according to the present invention has a first travel control mode and a second travel control mode. When in a transitional state from the second travel control mode to the first travel control mode, the vehicle control device calculates and checks a first control parameter used in the first travel control mode, calculates a second control parameter used in the second travel control mode, and uses the second control parameter for traveling control.

11 Claims, 13 Drawing Sheets

(51) Int. Cl.
G06F 11/34 (2006.01)
G06F 11/20 (2006.01)
G06F 11/07 (2006.01)
G07C 5/08 (2006.01)

(52) U.S. Cl.
CPC .......... *G06F 11/20* (2013.01); *G06F 11/2023* (2013.01); *G06F 11/302* (2013.01); *G06F 11/3013* (2013.01); *G06F 11/3495* (2013.01); *G07C 5/0808* (2013.01)

(58) Field of Classification Search
CPC ............... G06F 11/3013; G06F 11/302; G06F 11/3495; G07C 5/0808
See application file for complete search history.

(56) References Cited

U.S. PATENT DOCUMENTS

| | | |
|---|---|---|
| 2002/0092696 A1 | 7/2002 | Bohner et al. |
| 2002/0138550 A1 | 9/2002 | Mori et al. |
| 2008/0215913 A1 | 9/2008 | Terayama et al. |
| 2010/0162042 A1 | 6/2010 | Inoue et al. |
| 2015/0210166 A1* | 7/2015 | Nakagawara ........... B60L 58/20 701/22 |
| 2016/0055047 A1* | 2/2016 | Okamoto .............. G06F 11/079 714/57 |

FOREIGN PATENT DOCUMENTS

| | | | |
|---|---|---|---|
| JP | 2006-209197 A | 8/2006 | |
| JP | 2008-305317 A | 12/2008 | |
| JP | 2010-020621 A | 1/2010 | |
| JP | 2010020621 * | 1/2010 | ............. G06F 11/20 |
| JP | 2012-168605 A | 9/2012 | |

OTHER PUBLICATIONS

Office Action dated Mar. 26, 2019 in the corresponding Japanese Patent Application No. 2015-151847.
International Search Report with English Translation and Written Opinion issued in corresponding International Application No. PCT/JP2016/071199 dated Oct. 18, 2016.

\* cited by examiner

VEHICLE CONTROL DEVICE

TECHNICAL FIELD

The present invention relates to a vehicle control device.

BACKGROUND ART

Embedded control devices to control an object to be controlled by so-called embedded software have been used in electrical equipment such as automobiles, elevators, and construction machines. The embedded software is advantageous in that flexible and advanced control can be realized as compared to the conventional control method using mechanical mechanisms and electrical circuits.

Integration of electronic control units (ECUs) to consolidate functions, which are conventionally mounted in different ECUs into one ECU has progressed in the embedded control devices (for example, vehicle control devices) in order for reduction in on-board space and manufacturing cost. As the ECU integration progresses, it becomes necessary to process a plurality of functions on the same ECU. Thus, utilization of a multi-core processor has begun in the vehicle control devices.

The multi-core processor can not only perform different processes in parallel using a plurality of cores but also process application software that has been assigned to a core with another core instead when the core malfunctions. Accordingly, it is possible to obtain multiplexing of a system and to improve safety.

The following PTL 1 describes a configuration example in which the entire core is restores to a normal state without stopping or restarting the entire system when some cores of a multi-core processor malfunction by performing a recovery process of the malfunctioning cores using normally-functioning cores.

CITATION LIST

Patent Literature

PTL 1: JP 2010-020621 A

SUMMARY OF INVENTION

Technical Problem

In the case of using the technique described in PTL 1 in an embedded control device such as an automobile, there is a possibility that history data in a program used for calculation processing of the malfunctioning core may be lost and a large control level difference may be generated before and after the core recovers to the normal state. The history data in the program indicates data that is consecutively updated, for example, a calculation result obtained by an integrator or a differentiator and a state quantity inside the system.

More specifically, when it is detected that some cores of a multi-core processor malfunction during travel control of an automobile, discontinuity of control occurs because history data in a program is lost even if the malfunctioning cores are recovered using the technique described in PTL 1 and a system is restored to a normal state, and there is a possibility that driving comfort may be impaired.

The present invention has been made in view of the above problems, and an object thereof is to provide a vehicle control device capable of alleviating a control level difference that occurs when malfunction is repaired and a system is restored to a normal state and providing smooth drivability for a user.

Solution to Problem

A vehicle control device according to the present invention has a first travel control mode and a second travel control mode, calculates and checks a first control parameter in the first travel control mode in a transitional state during transition from the second travel control mode to the first travel control mode, and calculates a second control parameter in the second travel control mode to be used for travel control.

Advantageous Effects of Invention

According to the vehicle control device according to the present invention, it is possible to provide smooth drivability for the user by alleviating the control level difference.

DESCRIPTION OF EMBODIMENTS

First Embodiment

Figure 1:
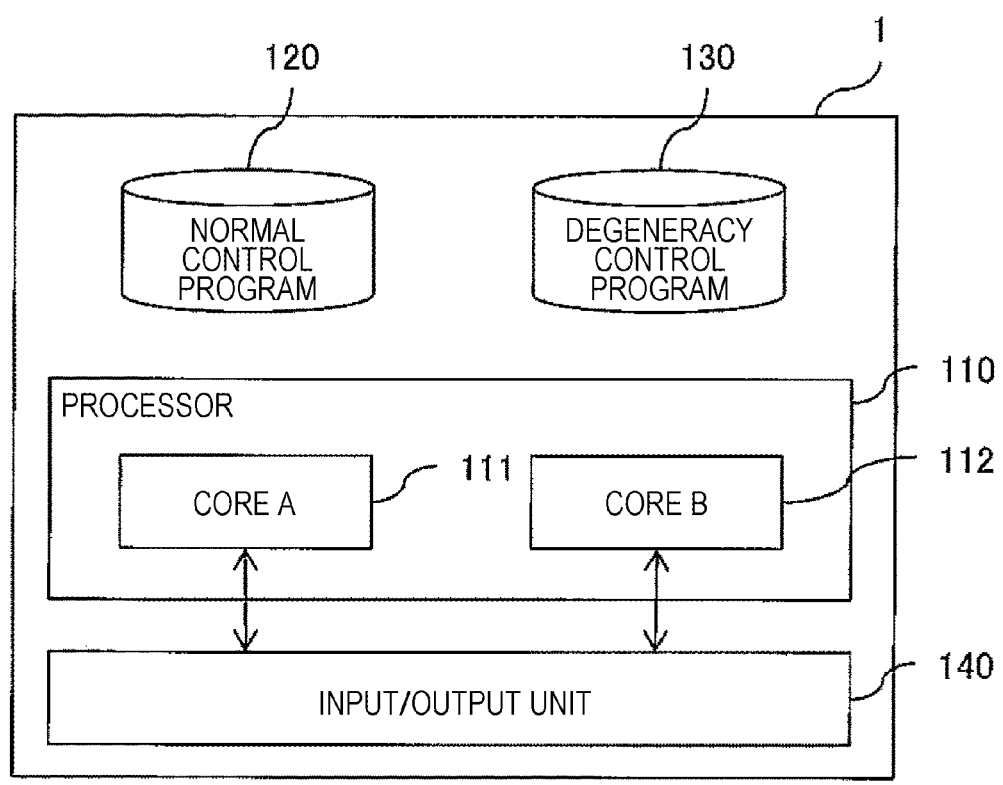
FIG. 1 is a system configuration diagram of a vehicle control device 1 according to a first embodiment.

FIG. 1 is a system configuration diagram of a vehicle control device 1 according to a first embodiment of the present invention. The vehicle control device 1 is a device that controls an operation of a vehicle. The vehicle control device 1 includes a processor 110, a normal control program 120, a degeneracy control program 130, and an input/output unit 140. The processor 110 is a multi-core processor and includes a core A 111 and a core B 112.

The core A 111 executes a normal control program 120, and the core B 112 executes a degeneracy control program 130. The input/output unit 140 receives a signal from a sensor or the like arranged outside the vehicle control device 1, hands over the signal to the processor 110, receives a control signal from the processor 110, and outputs the control signal to an object to be controlled.

The normal control program 120 is a program mounting a control process that needs be executed by the processor 110 when the vehicle performs normal traveling. The degeneracy control program 130 is a program mounting a control process that needs be executed by the processor 110 when the vehicle performs degeneracy traveling. The degeneracy traveling is traveling in a state where a function of the vehicle is degenerated due to a factor that an error is found in the normal traveling or the like.

Figure 2:
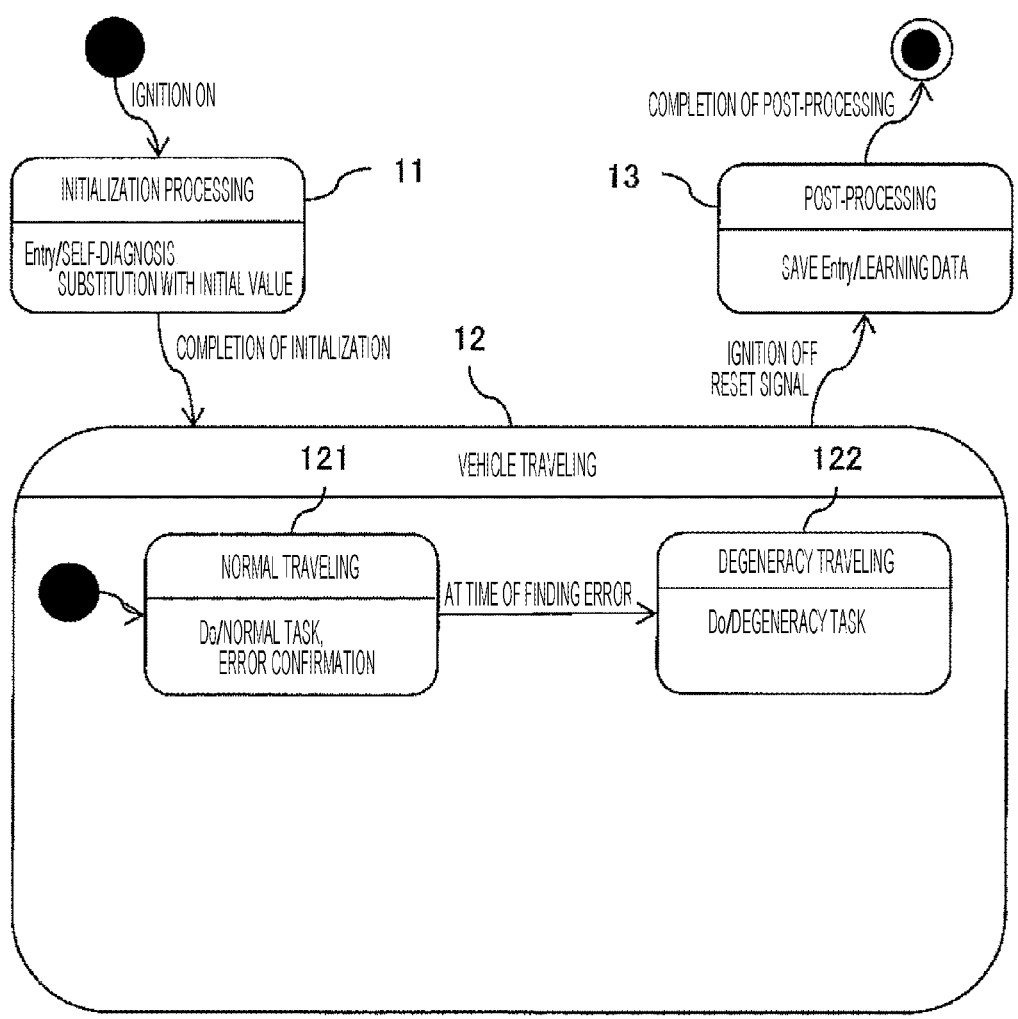
FIG. 2 is a state transition diagram illustrating a behavior of a vehicle control device of the related art.

FIG. 2 is a state transition diagram illustrating a behavior of a vehicle control device of the related art. Generally, a vehicle travels by operating an actuator such as a motor in accordance with an output value output from the vehicle control device. When an ignition is turned on, the vehicle control device transitions to an initialization processing mode 11.

In the initialization processing mode 11, the vehicle control device starts self-diagnosis and executes initialization processing such as substituting an initial value for a predetermined variable. Upon completion of the initialization processing, the vehicle control device transitions to a vehicle traveling mode 12, and the vehicle is in turned into a state where the vehicle can actually travel.

When transitioning to the vehicle traveling mode 12, the vehicle control device first enters a normal traveling mode 121 state. In the normal traveling mode 121, the vehicle control device executes processing such as (a) a periodic task to execute arithmetic processing every constant period, (b) an aperiodic task to execute arithmetic processing at timing such as rotation of an engine, and (c) error confirmation to monitor occurrence of an error in the vehicle control device. Each task includes a process of calculating a control parameter to be used for operating the vehicle in the normal traveling mode 121. When an error is found in the normal traveling mode 121, the vehicle control device transitions to the degeneracy traveling mode 122. The error referred to herein means a state where a possibility of causing danger to a user when continuing normal traveling reaches a certain degree.

The degeneracy traveling mode 122 is a safety mechanism that safety standards such as ISO 26262 demands. In the degeneracy traveling mode 122, the vehicle control device does not suddenly stop the control function even when the error of the vehicle control device has been confirmed, but the vehicle is continuously controlled by continuously performing a calculation process of only a minimum function as necessary. In the degeneracy traveling mode 122, the vehicle control device executes periodic/aperiodic tasks for executing the degeneracy traveling. Each task includes a process of calculating a control parameter to be used for operating the vehicle in the degeneracy traveling mode 122.

When the ignition is turned off in the vehicle traveling mode 12 or when a signal to reset the vehicle control device is issued in the state of the vehicle traveling mode 12, the vehicle control device transitions to a post-processing mode 13.

In the post-processing mode 13, the vehicle control device causes learning data, necessary at the time of turning on the ignition next time, to be saved in the nonvolatile memory. When the post-processing is completed, the vehicle control device stops the function, and accordingly, the vehicle is also stopped.

The vehicle control device executes traveling of the vehicle by executing the above-described state transition. When the error is found in the normal traveling mode 121 and the mode is shifted to the degeneracy traveling mode 122, it is necessary to restart the entire system of the vehicle control device by turning off the ignition or issuing a reset signal in order to cause transition to the normal traveling mode 121 again. Therefore, there is a possibility that the control parameter may intermittently change before and after the restart to prevent realization of smooth drivability.

Figure 3:
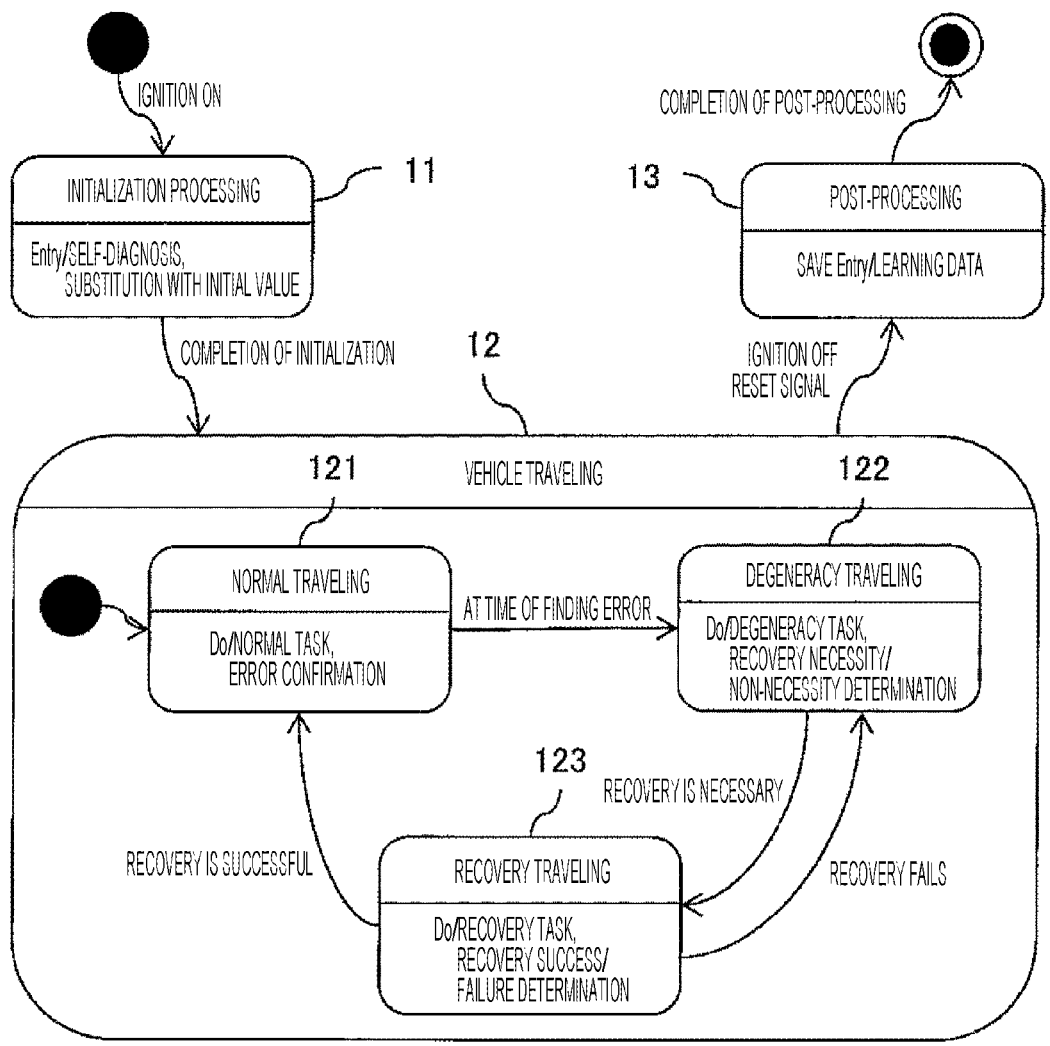
FIG. 3 is a state transition diagram illustrating a behavior of the vehicle control device 1 according to the first embodiment.

FIG. 3 is a state transition diagram illustrating a behavior of the vehicle control device 1 according to the first embodiment. In FIG. 3, a recovery traveling mode 123 is newly provided as compared with FIG. 2. Although it is necessary to turn off the ignition in order to return to the normal traveling mode from the degeneracy traveling mode 122 in FIG. 2, the vehicle control device 1 returns to the normal traveling mode 121 via the recovery traveling mode 123 from the degeneracy traveling mode 122, thereby smoothly returning to the normal state without intermitting the control parameter in the present embodiment.

In the degeneracy traveling mode 122 of the first embodiment, recovery necessity/non-necessity determination is executed in order to determine whether or not the vehicle control device 1 needs to transition to the recovery traveling mode 123. There are various factors to determine the necessity or non-necessity of the recovery, and examples thereof include a lapse of a predetermined time since the transition to the degeneracy traveling mode 122, but the invention is not limited thereto.

In the recovery traveling mode 123, the vehicle control device 1 executes periodic/aperiodic tasks for executing the recovery traveling. Further, recovery success/failure determination is executed in the recovery traveling mode 123 to determine whether to cause the vehicle to transition to the normal traveling mode 121 or to return to the degeneracy traveling mode 122. Details of the recovery success/failure determination will be described later. As the recovery traveling mode 123 is provided, the vehicle control device 1 can be recovered to the normal traveling mode 121 without restarting the entire vehicle even when detecting the error.

Figure 4:
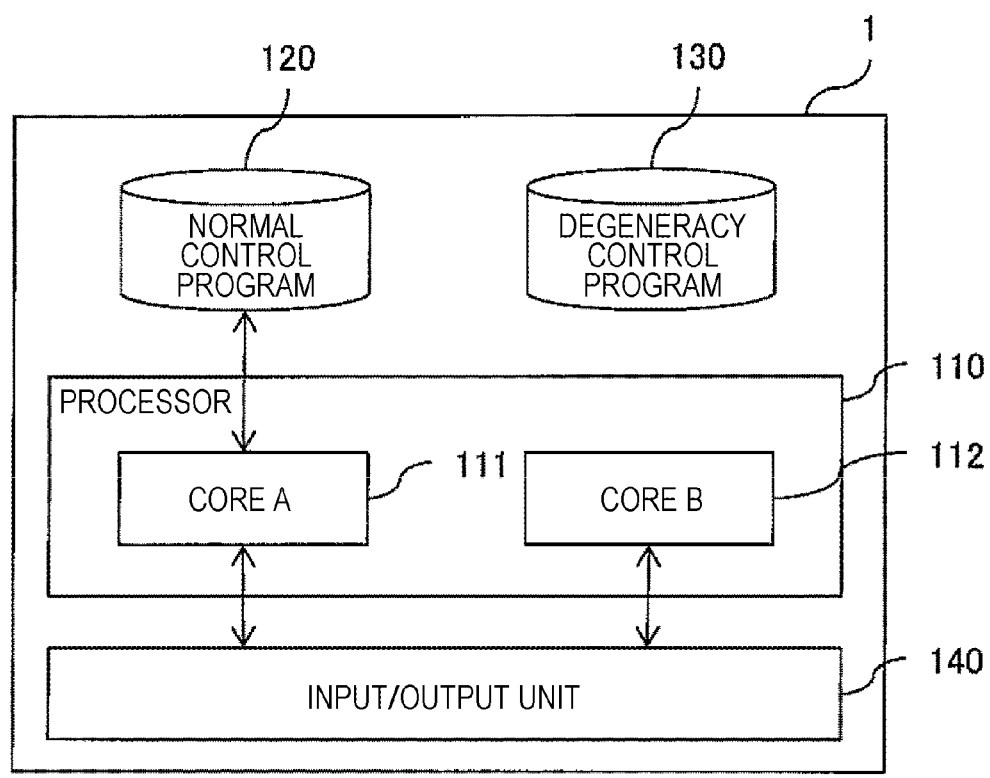
FIG. 4 is a diagram illustrating a state where the vehicle control device 1 executes a normal traveling mode 121.

FIG. 4 is a diagram illustrating a state where the vehicle control device 1 executes the normal traveling mode 121. In the normal traveling mode 121, the core A 111 executes the normal control program 120, and outputs a control signal, which uses an output value thereof as a control parameter, via the input/output unit 140, thereby controlling the vehicle. The normal control program 120 is a control program mounting a normal task and an error confirmation process in the normal traveling mode 121. The core A 111 may simultaneously execute processing other than the normal control program 120.

Figure 5:
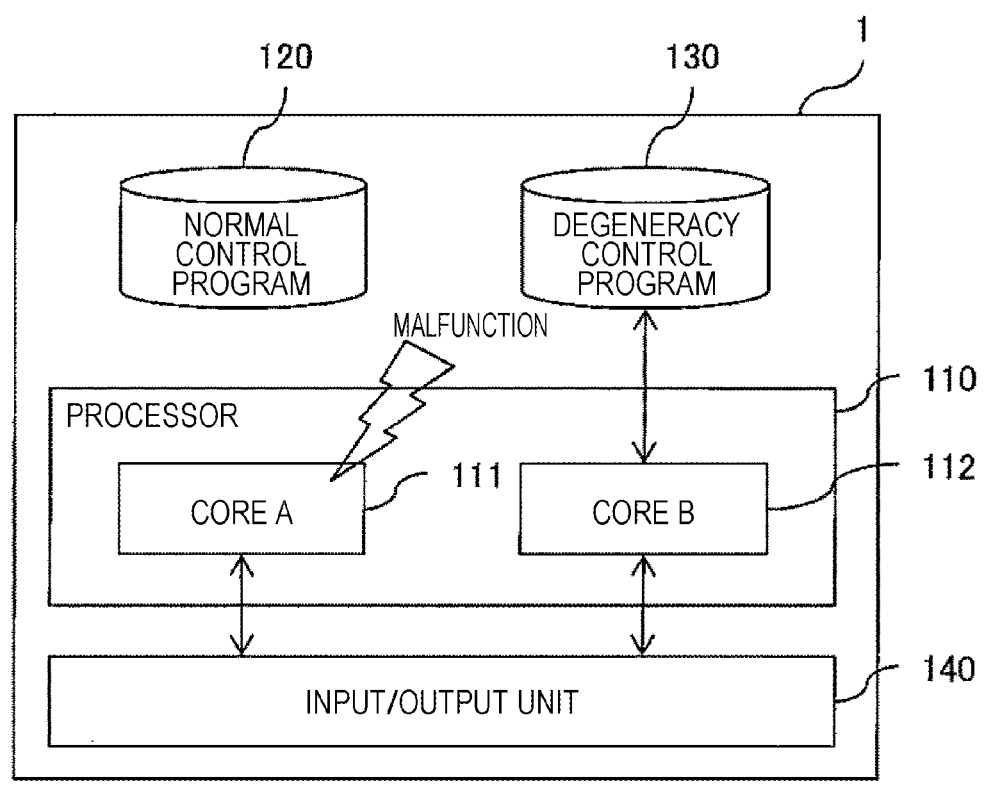
FIG. 5 is a diagram illustrating a state where the vehicle control device 1 executes a degeneracy traveling mode 122.

FIG. 5 is a diagram illustrating a state where the vehicle control device 1 executes the degeneracy traveling mode 122. The degeneracy traveling mode 122 is executed, for example, when malfunction occurs in the core A 111 and it becomes difficult for the core A 111 to execute the normal control program 120. The core B 112 executes the degeneracy control program 130 as an alternative to the normal control program 120, and outputs a control signal, which uses an output value thereof as a control parameter, via the input/output unit 140, thereby controlling the vehicle. The degeneracy control program 130 mounts a degeneracy task and a return necessity/non-necessity determination process in the degeneracy traveling mode 122. The core B 112 may simultaneously execute processing other than the degeneracy control program 130.

Figure 6:
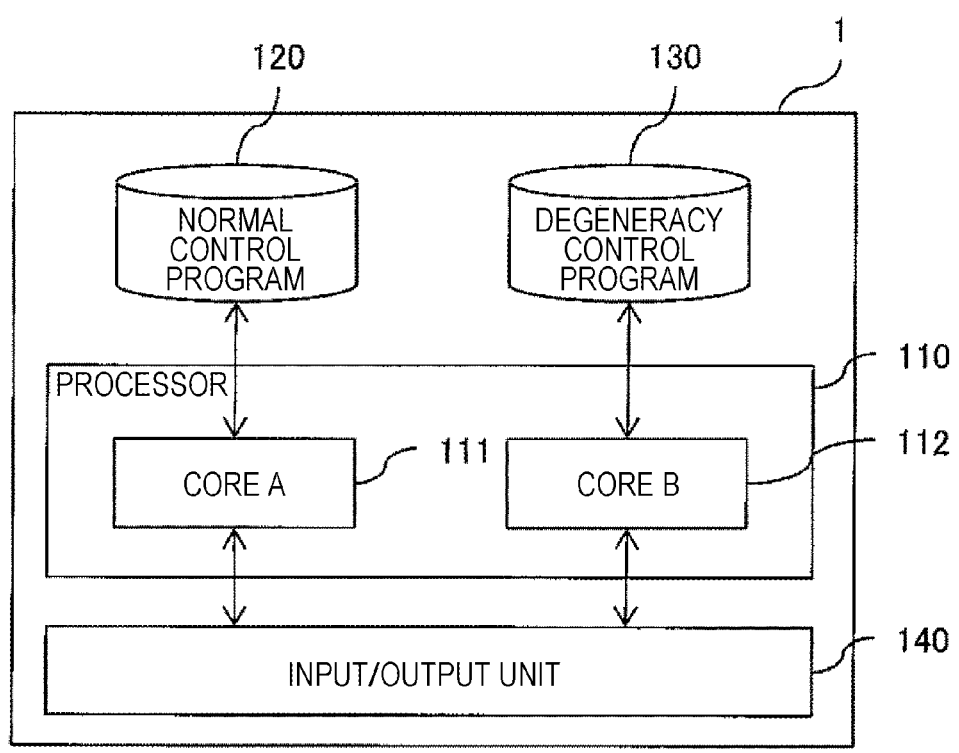
FIG. 6 is a diagram illustrating a state where the vehicle control device 1 executes a recovery traveling mode 123.

FIG. 6 is a diagram illustrating a state where the vehicle control device 1 executes the recovery traveling mode 123. In the recovery traveling mode 123, the core A 111 (malfunction is detected) executes the normal control program 120, and concurrently, the core B 112 executes the degeneracy control program 130.

In the recovery traveling mode 123, the processor 110 controls the vehicle using the output value of the degeneracy control program 130 executed by the core B 112 as the control parameter without using the output value of the core A 111 for the vehicle control in order to secure safety. Meanwhile, it is possible to determine whether or not the error found in the normal traveling mode 121 is a transitional error by executing the normal control program 120 to calculate and check the control parameter.

When the error found in the normal traveling mode 121 is reproduced in the recovery traveling mode 123, it is determined as recovery failure in the recovery success/failure determination process assuming that permanent malfunction such as a short-circuit of a circuit has occurred instead of an instantaneous error, and the vehicle control device returns to the degeneracy traveling mode 122. When the error found in the normal traveling mode 121 is not reproduced, it is determined as recovery success in the recovery success/failure determination process assuming that transitional malfunction caused by cosmic rays or the like has occurred, and the vehicle control device returns to the normal traveling mode 121.

Figure 7:
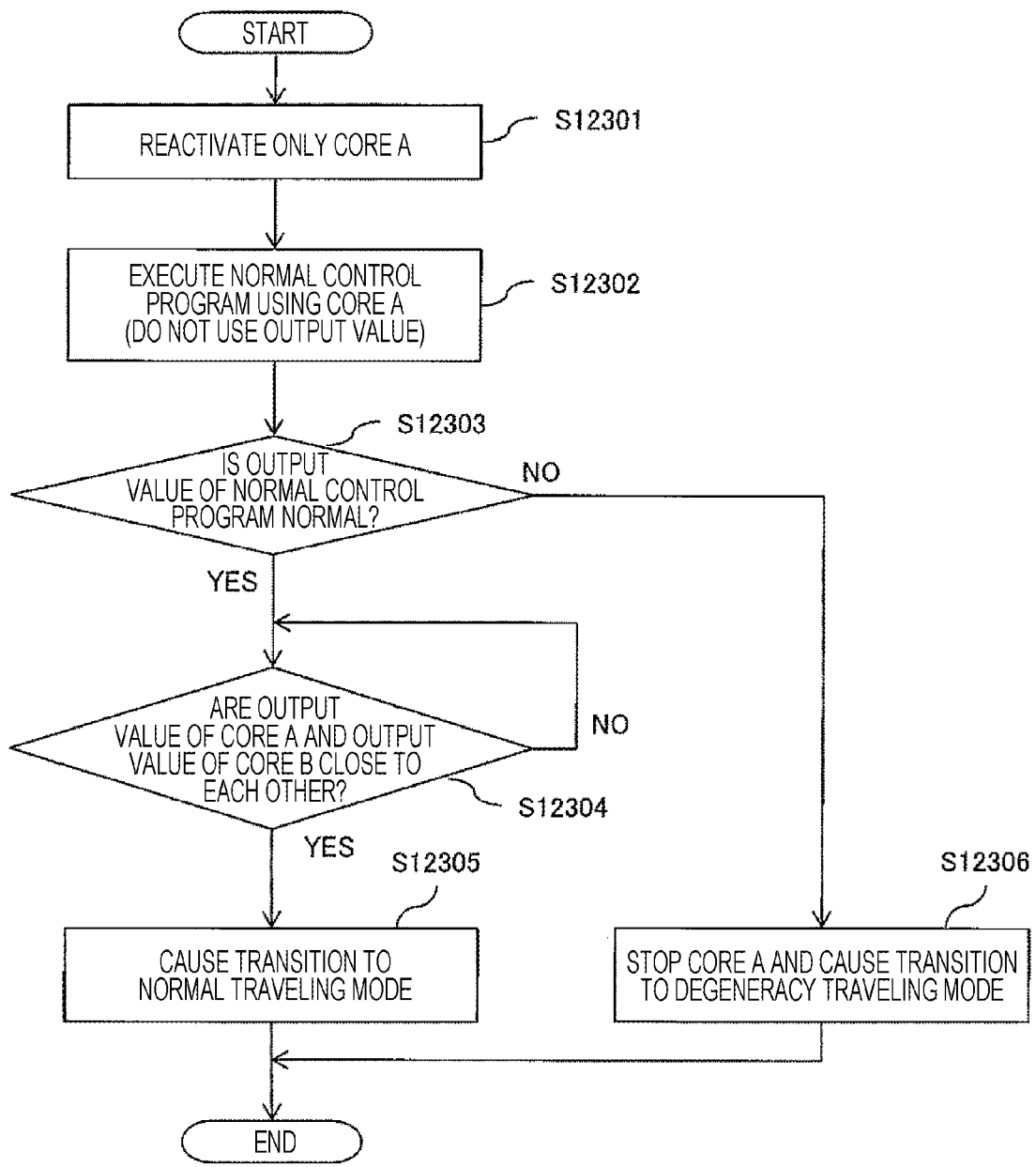
FIG. 7 is a flowchart describing a procedure to execute the recovery traveling mode 123 by the vehicle control device 1.

FIG. 7 is a flowchart describing a procedure to execute the recovery traveling mode 123 by the vehicle control device 1. Each step of FIG. 7 will be described hereinafter.

(FIG. 7: Steps S12301 to S12302)

The processor 110 restarts only the core A 111 for which an error is detected in the normal traveling mode 121 (S12301). The core A 111 executes the normal control program 120 (S12302). Meanwhile, the output value obtained by executing the normal control program 120 is not used for vehicle control as described above.

(FIG. 7: Step S12303)

The processor 110 confirms whether or not the output value of the normal control program 120 executed by the core A 111 is normal. For example, it is possible to consider a determination method, for example, in which upper and lower limit values that the control parameter calculated by the normal control program 120 can take are defined in advance and it is determined as normal when the output value falls within a range of the defined values for a predetermined time or longer. When the output value is normal, the error found in the normal traveling mode 121 is regarded as the transitional error, and the process proceeds to Step S12304. Otherwise, it is regarded as the permanent error, and the process proceeds to Step S12306.

(FIG. 7: Step S12304)

The processor 110 determines whether or not the output value of the normal control program 120 executed by the core A 111 and the output value of the degeneracy control program 130 executed by the core B 112 are sufficiently close to each other. For example, when a state where a difference therebetween is less than a predetermined threshold value continues for a predetermined time, it is possible to regard that these output values are sufficiently close to each other. When the above conditions are satisfied, the process proceeds to Step S12305. Otherwise, this step is continued.

(FIG. 7: Step S12304: Supplement 1)

When the output value of the normal control program 120 and the output value of the degeneracy control program 130 are not close to each other, a large control level difference occurs at the timing of transition from the recovery traveling mode 123 to the normal traveling mode 121 (the control parameter greatly changes in an intermittent manner at the time of mode transition), and there is a possibility that smooth drivability may be impaired. A reason that causes this control level difference is because history data such as an integrator/differentiator in the normal control program 120 processed by the core A 111 and a state quantity inside the system is lost by restarting the core A 111. Thus, the control level difference is alleviated in the first embodiment by executing the normal control program 120, in advance, in the recovery traveling mode 123 before being recovered to the normal traveling mode 121 and recollecting history data.

(FIG. 7: Step S12304: Supplement 2)

It is also possible to consider a case where the control level difference hardly occurs as long as the output value falls within a normal range depending on a property of a control parameter. In such a case, the process can proceed to S12305 by skipping this step if the output value of the normal control program 120 is normal in Step S12303.

(FIG. 7: Steps S12303 to S12304: Supplement)

These steps correspond to the recovery success/failure determination processing in FIG. 3. These steps may be executed by the core B 112 or a third processor core (not illustrated).

(FIG. 7: Step S12305)

The processor 110 causes the vehicle control device 1 to transition from the recovery traveling mode 123 to the normal traveling mode 121.

(FIG. 7: Step S12306)

The processor 110 stops the core A 111 and causes the vehicle control device 1 to transition from the recovery traveling mode 123 to the degeneracy traveling mode 122.

Figure 8:
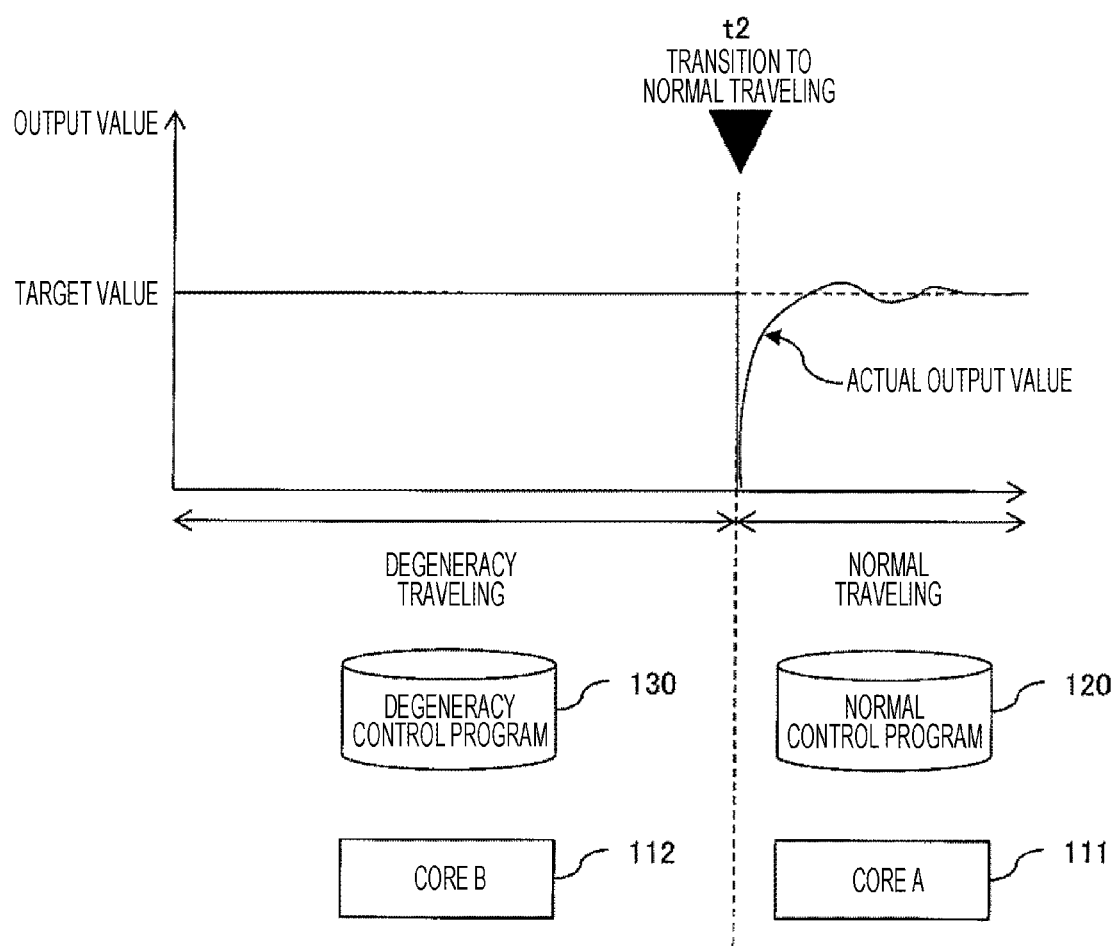
FIG. 8 is a view illustrating a change over time of an output value of the vehicle control device of the related art.

FIG. 8 is a view illustrating a change over time of an output value of the vehicle control device of the related art. The vertical axis represents an output value of a control signal (control parameter) output from the vehicle control device, and the horizontal axis represents an elapsed time. It is assumed that the vehicle control device has transitioned from the degeneracy traveling mode 122 to the normal traveling mode 121 at a time t2.

Although the recovery from the degeneracy traveling mode 122 to the normal traveling mode 121 is possible even in the related art, the history data such as the integrator/differentiator in the normal control program 120 and the state quantity inside the system are lost by restarting the core A 111, and thus, an actual output value greatly deviates from a target output value at the time t2, and the control level difference becomes large. This large control level difference becomes a factor that impairs the smooth drivability.

Figure 9:
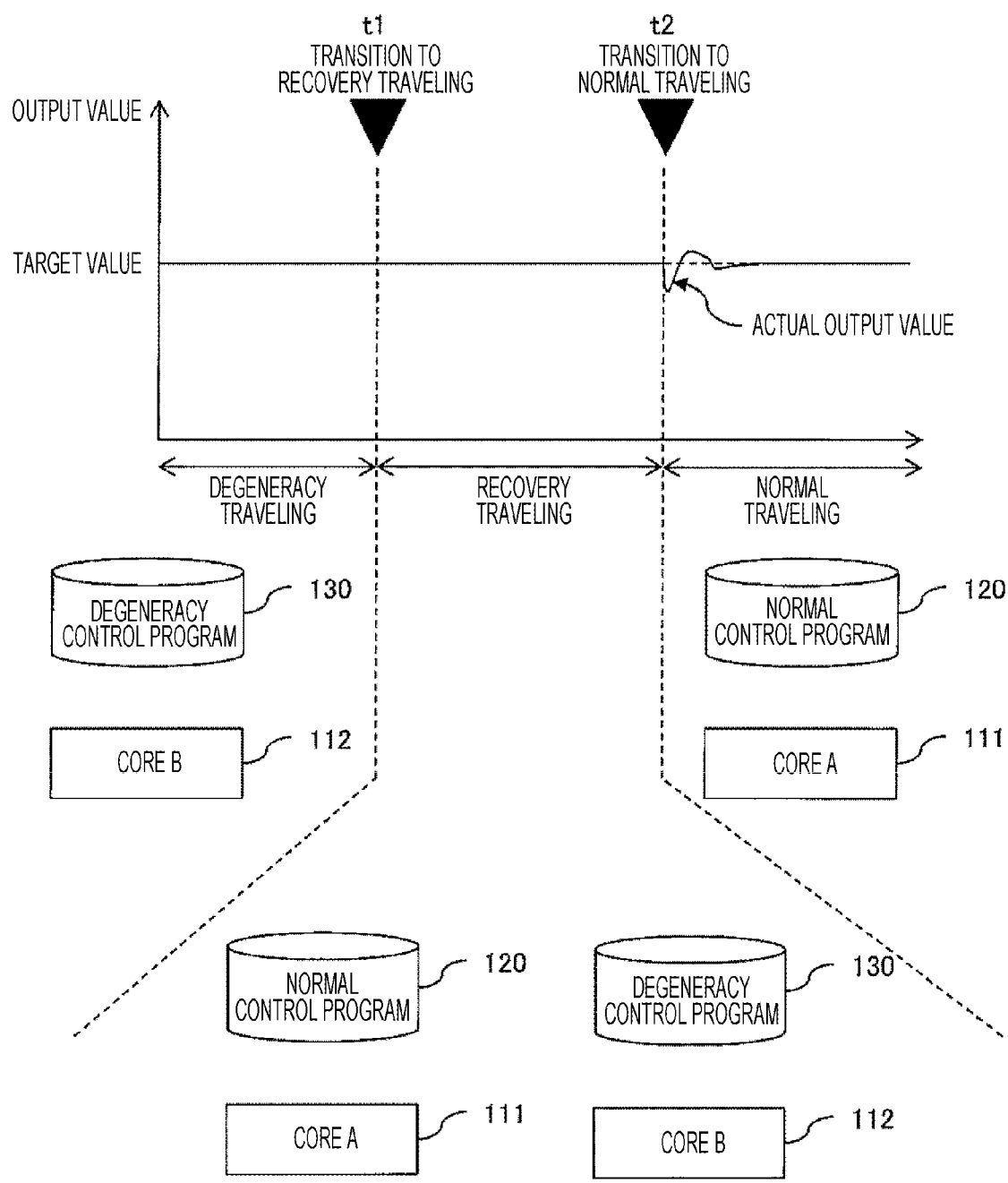
FIG. 9 is a view illustrating a change over time of an output value output by the vehicle control device 1 via an input/output unit 140.

FIG. 9 is a view illustrating a change over time of the output value output by the vehicle control device 1 via the input/output unit 140. It is assumed that the vehicle control device 1 has transitioned from the degeneracy traveling mode 122 to the recovery traveling mode 123 at a time t1 and has further transitioned to the normal traveling mode 121 at a time t2. The vertical axis and the horizontal axis are the same as those in FIG. 8.

The vehicle control device 1 can execute the normal control program 120 using the core A 111 in the recovery traveling mode 123 and recollect the history data such as the integrator/differentiator and the state quantity inside the system before being recovered to the normal traveling mode 121. Accordingly, it is possible to alleviate the control level difference at the time of recovery to the normal traveling mode 121 at the time t2 and to grant the smooth drivability to the user.

Figure 10:
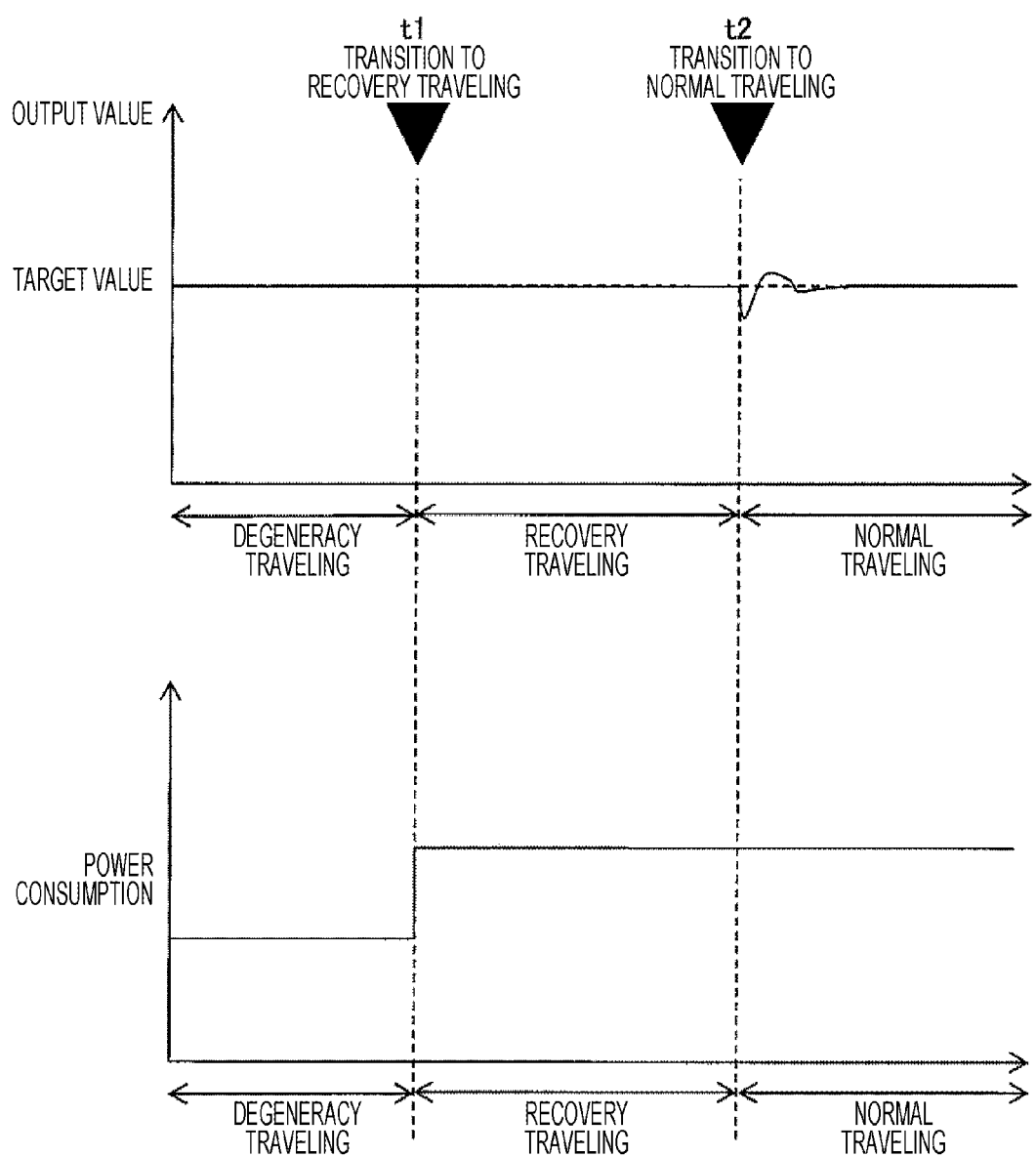
FIG. 10 is a view illustrating a change over time in power consumption of the vehicle control device 1.

FIG. 10 is a view illustrating a change over time in power consumption of the vehicle control device 1. It is known that a multi-core processor can reduce power consumption of the processor as a whole by sleeping an unused core. Thus, the vehicle control device 1 can suppress the power consumption of the vehicle control device 1 as a whole by stopping the core A 111 or shifting the core A 111 to a sleep mode or the like in the degeneracy traveling mode 122 to lower the power consumption than that in the normal operation.

Since the core A 111 is operated in the normal traveling mode 121 and the recovery traveling mode 123, the power consumption of the vehicle control device 1 becomes higher than that in the degeneracy traveling mode 122. In addition, it is possible to suppress the power consumption by causing the transition from the recovery traveling mode 123 to the degeneracy traveling mode 122 if the recovery from the recovery traveling mode 123 to the normal traveling mode 121 is not possible for any reasons.

It is desirable that the processor 110 also activate the core B 112 while executing the normal traveling mode 121 in order to immediately cause the transition to the degeneracy traveling mode 122 when the error is detected in the normal traveling mode 121.

First Embodiment: Summary

The vehicle control device 1 according to the first embodiment executes the recovery traveling mode 123 before being recovered from the degeneracy traveling mode 122 to the normal traveling mode 121, calculates and checks the control parameter of the normal traveling mode 121 in the recovery traveling mode 123, and calculates the control parameter of the degeneracy traveling mode 122 to be used for vehicle control. Accordingly, the control parameter in the same mode is calculated in advance before being recovered to the normal traveling mode 121, and it is possible to alleviate the intermittent change of the control parameter at the time of recovery.

Second Embodiment

Figure 11:
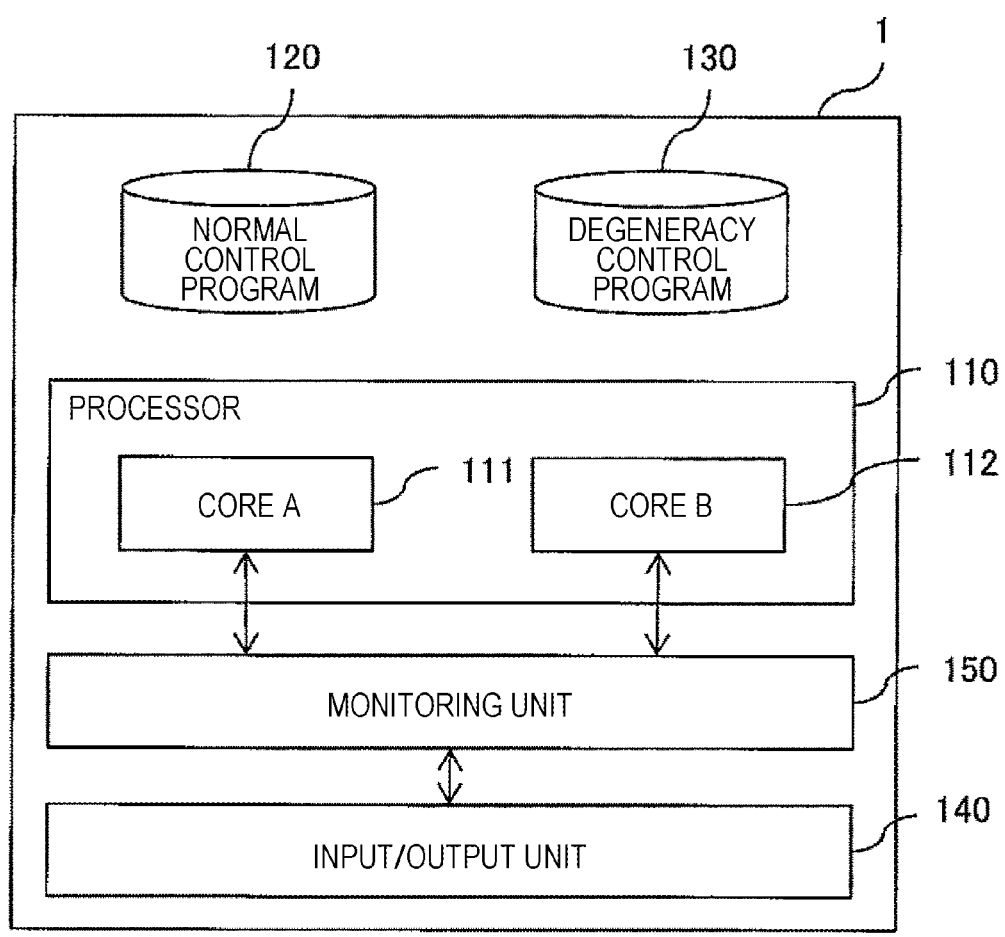
FIG. 11 is a system configuration diagram of a vehicle control device 1 according to a second embodiment.

FIG. 11 is a system configuration diagram of the vehicle control device 1 according to a second embodiment of the present invention. In the second embodiment, the vehicle control device 1 includes a monitoring unit 150 in addition to the configurations described in the first embodiment. The other configurations are the same as those in the first embodiment.

The monitoring unit 150 uses either the output value of the normal control program 120 or the output value of the degeneracy control program 130 to determine whether to control the vehicle, and hands over the output value to be adopted to the input/output unit 140. For example, the monitoring unit 150 receives each of the output value of the normal control program 120 and the output value of the degeneracy control program 130 in the recovery traveling mode 123, and can adopt one that is closer to a normal range, which has been defined in advance, as a control parameter for the vehicle control.

Third Embodiment

Figure 12:
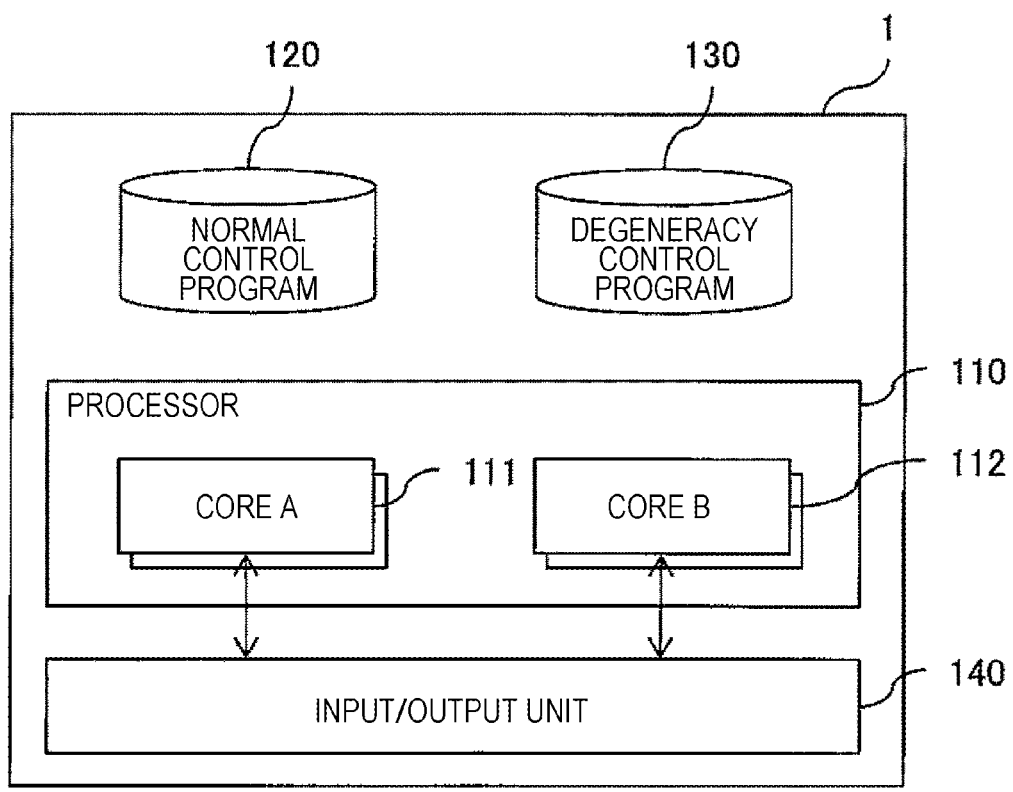
FIG. 12 is a system configuration diagram of a vehicle control device 1 according to a third embodiment.

FIG. 12 is a system configuration diagram of the vehicle control device 1 according to a third embodiment of the present invention. In the third embodiment, the core A 111 and the core B 112 are configured as lockstep cores, respectively. The lockstep cores detect an error by executing the same calculation using a plurality of processor cores and mutually comparing results of such execution. Therefore, the vehicle control device 1 according to the third embodiment detects the error of the core A 111 based on output inconsistency between the lockstep cores in the error confirmation process of the normal traveling mode 121. The other configurations are the same as those in the first embodiment.

Fourth Embodiment

Figure 13:
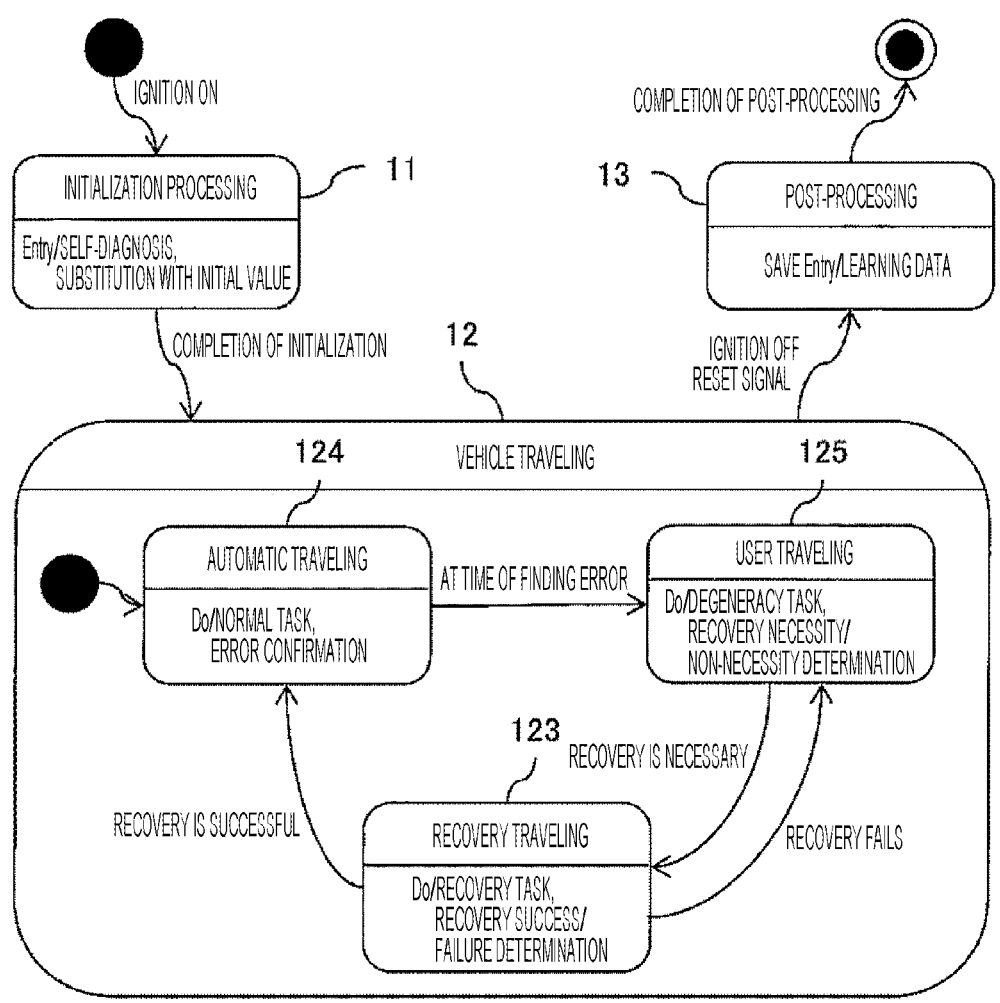
FIG. 13 is a state transition diagram illustrating a behavior of a vehicle control device 1 according to a fourth embodiment.

FIG. 13 is a state transition diagram illustrating a behavior of the vehicle control device 1 according to a fourth embodiment of the present invention. In the fourth embodiment, the vehicle control device 1 is a device that controls an operation of an automatic traveling car. The vehicle control device 1 according to the fourth embodiment executes an automatic traveling mode 124 instead of the normal traveling mode 121 and executes a user traveling mode 125 instead of the degeneracy traveling mode 122. The other configurations are the same as those in the first embodiment.

The automatic traveling mode 124 is an operation mode in which the vehicle is caused to autonomously travel. The user traveling mode 125 is an operation mode in which a driver causes the vehicle to travel by manual control. In each mode, the processor 110 calculates a control parameter to be used for operating the vehicle in the corresponding mode.

According to the fourth embodiment, it is possible to provide smooth ride feeling by alleviating the control level difference similarly as in the other embodiments even when an error is detected during automatic traveling of the automatic traveling car and the automatic traveling is recovered after once shifting to the manual control.

Regarding Modification Examples of the Present Invention

Incidentally, the present invention is not limited to the above-described embodiments, and includes various modification examples. For example, the above-described embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be added to a configuration of a certain embodiment. In addition, addition, deletion or substitution of other configurations can be made with respect to some configurations of each embodiment.

The present invention is not limited to passenger cars but can be applied to various kinds of vehicles, such as trains and transportation equipment, and control devices thereof. The control parameter calculated by the processor 110 can be determined according to the content of control processing necessary for controlling electrical equipment to be controlled by the vehicle control device 1. For example, when the vehicle control device 1 controls an electric car, it is possible to calculate a control parameter for controlling the driving of an on-board inverter. Alternatively, it is possible to calculate a control parameter for controlling the driving of an on-board engine in the case of controlling a gasoline-driven car.

In the above-described embodiments, the processor 110 may execute the recovery traveling mode 123 by executing the program mounting the recovery traveling mode 123 or executing the same mode by mounting the same function to hardware such as a circuit device and calling the function.

In the above-described embodiments, the processor 110 may include a processor core for executing the recovery traveling mode 123 and execute the recovery traveling mode using the core. However, it is necessary for the core A 111 to execute at least the normal control program 120 in order to determine whether or not the error of the core A 111 has recovered. Therefore, it is desirable that the core that executes the recovery traveling mode 123 execute only the recovery task and recovery success/failure determination.

A part or all of each of the above-described configurations, functions, processing units, processing means, and the like may be realized, for example, by hardware by designing with an integrated circuit and the like. In addition, each of the above-described configurations, functions, and the like may also be realized by software by causing a processor to interpret and execute a program for realizing each of the functions. Information such as programs, tables, and files that realize the respective functions can be stored in a storage device such as a memory, a hard disk, and a solid state drive (SSD), or a storage medium such as an IC card, an SD card, and a DVD.

REFERENCE SIGNS LIST 1 vehicle control device
110 processor
111 core A
112 core B
120 normal control program
130 degeneracy control program
140 input/output unit
11 initialization processing mode
12 vehicle traveling mode
121 normal traveling mode
122 degeneracy traveling mode
123 recovery traveling mode
13 post-processing mode

The invention claimed is:

1. A vehicle control device for controlling a traveling operation of a vehicle, the vehicle control device comprising a processor configured to calculate a control parameter to control the traveling operation of the vehicle, wherein the processor is configured to execute:
a first travel control mode in which the vehicle is caused to travel according to a first control program;
a second travel control mode in which the vehicle is caused to travel according to a second control program, wherein in the second travel control mode a function is degenerated as compared to the first travel control mode; and
a third travel control mode in which the processor calculates a first control parameter to control the traveling operation of the vehicle using the first control program, calculates a second control parameter to control the traveling operation of the vehicle using the second control program, and outputs the first control parameter and the second control parameter to a monitor;
wherein the processor is configured to transition from the third travel control mode to the first travel control mode when it is determined that the first control parameter is normal in the third travel control mode, and return to the second travel control mode from the third travel control mode when it is determined that the first control parameter is not normal,
wherein the processor is configured to measure a time during which a difference between the first control parameter and the second control parameter is equal to or less than a predetermined threshold value before returning to the second travel control mode from the third travel control mode, and transition from the third travel control mode to the first travel control mode at a point in time at which the time during which the difference is equal to or less than the predetermined threshold value reaches a predetermined time or longer; and
the monitor, which is configured to select one of the first control parameter and the second control parameter and transmit the selected one of the first control parameter and the second control parameter to an input/output unit for control of the vehicle.

2. The vehicle control device according to claim 1, wherein
the processor comprises:
a first processor core that executes the first control program; and a second processor core that executes the second control program, and
the processor is configured to calculate the second control parameter by causing the second processor core to execute the second control program in parallel with calculating the first control parameter by causing the first processor core to execute the first control program in the third travel control mode.

3. The vehicle control device according to claim 2, wherein
the processor is configured such that, when the second processor core executes the second control program, the processor causes the first processor core to transition to a state where power consumption is lower than power consumption when the first processor core executes the first control program.

4. The vehicle control device according to claim 2, wherein
the processor is configured such that the processor consumes more power when executing the third travel control mode by operating the first processor core and the second processor core in parallel than when executing the second travel control mode.

5. The vehicle control device according to claim 2, wherein
the processor is configured to initialize the first processor core by restarting the first processor core after transition from the first travel control mode to the third travel control mode and before starting calculation of the first control parameter.

6. The vehicle control device according to claim 5, wherein the first processor core is operated in the first travel control mode and the second travel control mode.

7. The vehicle control device according to claim 5, further comprising, following restarting of the first processor core, transitioning to the first travel control mode responsive to determining that a difference in an output of the first processor core and an output of the second processor core is less than a predetermined difference.

8. The vehicle control device according to claim 1, wherein the processor is configured to calculate the control parameter to be used for controlling an on-board inverter mounted on the vehicle.

9. The vehicle control device according to claim 1, wherein the processor is configured to calculate the control parameter to be used for controlling an engine mounted on the vehicle.

10. The vehicle control device according to claim 1, wherein
the processor is configured to calculate the control parameter to be used for causing the vehicle to automatically travel in the first travel control mode, and
the processor is configured to calculate the control parameter to be used for manually causing the vehicle to travel in the second travel control mode.

11. The vehicle control device according to claim 1, wherein the monitor is configured to select the one of the first control parameter and the second control parameter that is closest to a predetermined normal range.

\* \* \* \* \*